United States Patent
Le et al.

(10) Patent No.: US 7,898,824 B2
(45) Date of Patent: Mar. 1, 2011

(54) POWER SUPPLY CIRCUIT WITH FEEDBACK CIRCUIT

(75) Inventors: Kun Le, Shenzhen (CN); Tong Zhou, Shenzhen (CN)

(73) Assignees: Innocom Technology (Shenzhen) Co., Ltd., Shenzhen, Guangdong Province (CN); Chimei Innolux Corporation, Miao-Li County (TW)

( * ) Notice: Subject to any disclaimer, the term of this patent is extended or adjusted under 35 U.S.C. 154(b) by 453 days.

(21) Appl. No.: 12/217,357

(22) Filed: Jul. 2, 2008

(65) Prior Publication Data
US 2009/0010030 A1    Jan. 8, 2009

(30) Foreign Application Priority Data
Jul. 4, 2007  (CN) .................... 2007 1 0076383

(51) Int. Cl.
*H02M 3/335* (2006.01)
(52) U.S. Cl. ................. 363/21.12; 363/56.01; 361/93.9
(58) Field of Classification Search ............. 363/21.08, 363/21.12, 21.15, 21.16, 21.18, 89, 95, 97, 363/56.01; 323/222, 266, 268, 338; 361/86, 361/87, 93.1, 93.9
See application file for complete search history.

(56) References Cited

U.S. PATENT DOCUMENTS

| | | | | |
|---|---|---|---|---|
| 5,796,596 A | * | 8/1998 | Williams | ................. 363/21.16 |
| 5,956,240 A | * | 9/1999 | Williams | ................. 363/21.16 |
| 6,542,388 B2 | * | 4/2003 | Amei | ....................... 363/56.01 |
| 6,812,916 B2 | | 11/2004 | Hwang | |
| 7,031,128 B2 | | 4/2006 | Nam | |
| 7,088,597 B2 | * | 8/2006 | Cho | ......................... 363/21.01 |
| 7,106,567 B2 | * | 9/2006 | Chloupek et al. | .......... 361/91.1 |
| 7,379,284 B2 | | 5/2008 | Fukushi et al. | |

FOREIGN PATENT DOCUMENTS

| | | |
|---|---|---|
| CN | 1269630 A | 10/2000 |
| CN | 1885698 A | 12/2006 |

\* cited by examiner

*Primary Examiner*—Rajnikant B Patel
(74) *Attorney, Agent, or Firm*—Wei Te Chung

(57) ABSTRACT

An exemplary power supply circuit (200) includes a pulse width modulation circuit (220) providing a pulse signal, a voltage conversion circuit (210) converting a primary voltage to an output voltage according to the pulse signal, a feedback circuit (260), and a control circuit (290). The feedback circuit includes a sampling branch (261) detecting a current of the voltage conversion circuit and accordingly providing a feedback signal, and a voltage division branch (262) electrically coupled to the sampling branch. The control circuit is electrically coupled to the voltage division branch, and is configured for disabling the voltage division branch after a predetermined period of time when the output voltage is within a predetermined range.

19 Claims, 2 Drawing Sheets

POWER SUPPLY CIRCUIT WITH FEEDBACK CIRCUIT

FIELD OF THE INVENTION

The present invention relates to power supply circuits, and more particularly to a power supply circuit having a feedback circuit.

GENERAL BACKGROUND

Power supply circuits are widely used in modern electronic devices, providing power voltage signals to enable function.

A conventional power supply circuit usually includes a voltage conversion circuit converting a primary voltage to an output voltage for a load circuit, a feedback circuit feeding back the output voltage, and a controller controlling a working state of the voltage conversion circuit according to a feedback signal provided by the feedback circuit. In operation, when the feedback signal indicates that the power supply circuit is in an overloaded state, the controller immediately directs the voltage conversion circuit to stop functioning, and the power supply circuit enters a protected state, to avoid burnout.

The power supply circuit may suddenly enter instantaneous overload, for when the load circuit transits from one steady state to another. Such instantaneous overload normally lasts for a very short time, after which the power supply circuit automatically recovers to a normal working state. However, once the instantaneous overload occurs, due to the mentioned feedback signal, the power supply circuit may be forced to enter the protected state and stop functioning. In this situation, an electronic device employing the power supply circuit can shut down unexpectedly, affecting reliability of the power supply circuit.

What is called for is a power supply circuit that can overcome the described shortcomings.

SUMMARY

In an exemplary embodiment, a power supply circuit includes a pulse width modulation circuit providing a pulse signal, a voltage conversion circuit converting a primary voltage to an output voltage according to the pulse signal, a feedback circuit, and a control circuit. The feedback circuit includes a sampling branch detecting a current of the voltage conversion circuit and providing a feedback signal accordingly, and a voltage division branch electrically coupled to the sampling branch. The control circuit is electrically coupled to the voltage division branch, is configured for disabling the voltage division branch after a predetermined period of time when the output voltage is within a predetermined range.

Other novel features and advantages will become more apparent from the following detailed description when taken in conjunction with the accompanying drawings.

DETAILED DESCRIPTION OF PREFERRED EMBODIMENTS

Reference will now be made to the drawings to describe preferred and exemplary embodiments of the present invention in detail.

Figure 1:
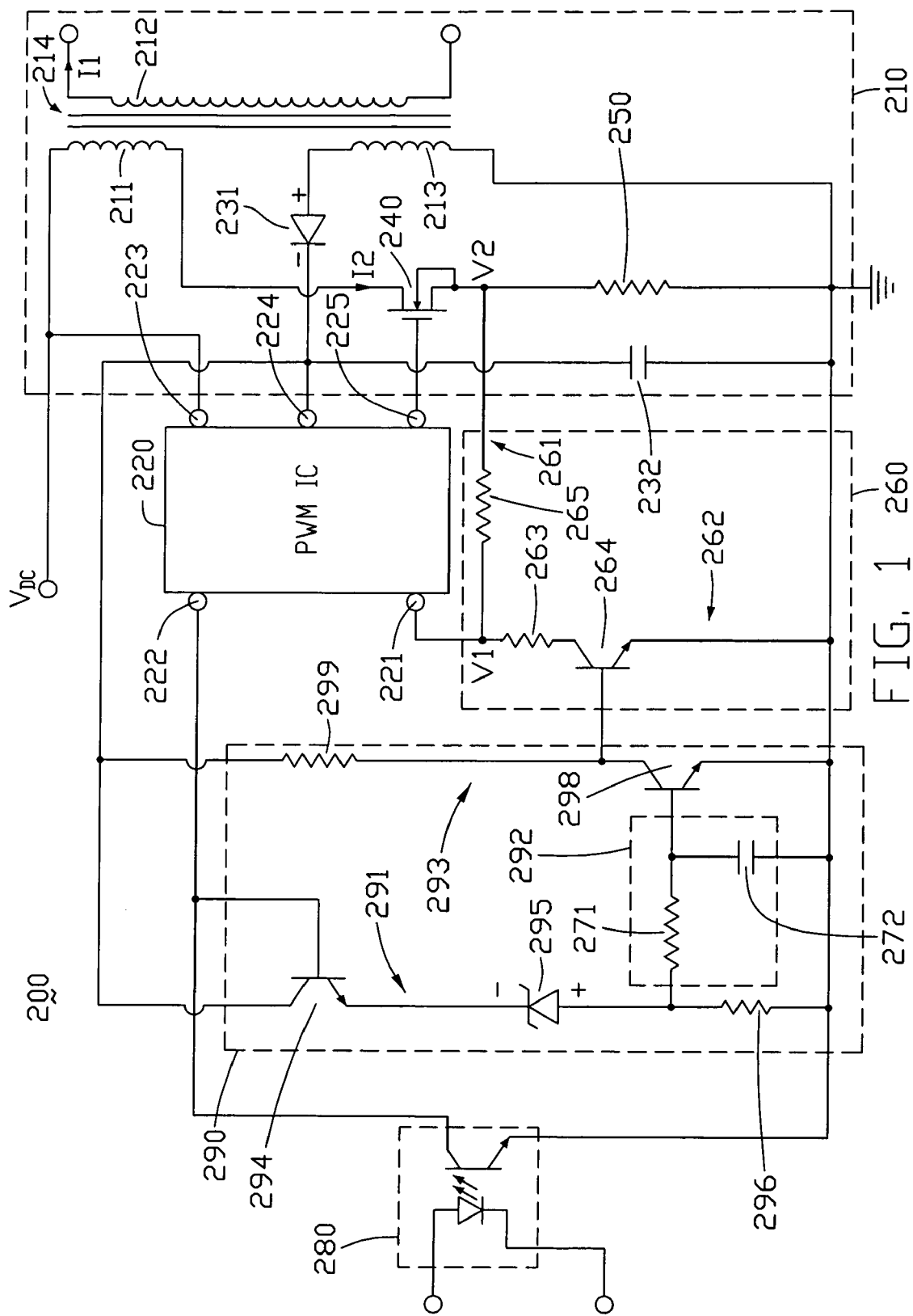
FIG. 1 is a diagram of a power supply circuit according to a first embodiment of the present invention.

FIG. 1 is a diagram of a power supply circuit 200 according to a first embodiment of the present invention. The power supply circuit 200 includes a voltage conversion circuit 210, a pulse width modulation integrated circuit (PWM IC) 220, a feedback circuit 260, a coupling circuit 280, and a control circuit 290.

The voltage conversion circuit 210 mainly converts a primary external direct current (DC) voltage signal $V_{DC}$ to an alternating current (AC) voltage signal. The voltage conversion circuit 210 includes a transformer 214, an electronic switch 240, a first resistor 250, a rectifying diode 231, and a filter capacitor 232. The electronic switch 240 can, for example, be an N-channel metal oxide semiconductor (MOS) transistor. The transformer 214 includes a first coil 211, a second coil 212, and a third coil 213. An end of the first coil 211 receives the external DC voltage signal $V_{DC}$, and the other end of the first coil 211 is connected to a drain electrode of the electronic switch 240. A gate electrode of the electronic switch 240 receives a pulse signal from the PWM IC 220, and a source electrode of the electronic switch 240 is grounded via the first resistor 250. The second coil 212 is connected to a load circuit (not shown), and outputs the AC voltage signal generated by the transformer 214 to the load circuit.

The third coil 213, the rectifying diode 231, and the filter capacitor 232 cooperatively form an inner power voltage generating circuit (not labeled) providing an inner power voltage signal to the PWM IC 220 and the control circuit 290. An end of the third coil 213 is connected to a positive terminal of the rectifying diode 231, and the other end of the third coil 213 is grounded. A negative terminal of the rectifying diode 231 outputs the inner power voltage signal, and is grounded via the filter capacitor 232.

The PWM IC 220 includes a first terminal 221 receiving a feedback signal provided by the feedback circuit 260, a second terminal 222 receiving a coupling voltage signal provided by the coupling circuit 280, a third terminal 223 receiving a start control signal, a fourth terminal 224 receiving the inner power voltage signal, and a fifth terminal 225 outputting the pulse signal to the electronic switch 240. In particular, the start control signal can employ the external DC voltage signal $V_{DC}$.

The feedback circuit 260 includes a sampling branch 261 and a voltage division branch 262. The sampling branch 261 includes a sampling resistor 265 connected between the first terminal 221 of the PWM IC 220 and the source electrode of the electronic switch 240. The voltage division branch 262 includes a voltage dividing resistor 263 and a first transistor 264. A base electrode of the first transistor 264 serves as a control terminal of the voltage division branch 262, and a collector electrode of the first transistor 264 is connected to the first terminal 221 of the PWM IC 220 via the voltage dividing resistor 263. Further, an emitter electrode of the first transistor 264 is grounded.

The coupling circuit 280 is electrically coupled between the load circuit and the second terminal 222 of the PWM IC 220, and provides a coupling voltage signal according to the output voltage signal. The feedback circuit 280 can be in the form of a photoelectric coupler having a light emitting diode (LED) and a photoelectric transistor. The LED provides light according to the output voltage, and the photoelectric transistor generates the coupling voltage signal according to the amount of light.

The control circuit 290 controls a working state of the first transistor 264, and correspondingly enables or disables the voltage division branch 262. The control circuit 290 includes a first control branch 291, a delay unit 292, and a second control branch 293. The first control branch 291 includes a second transistor 294, a Zener diode 295, and a pull-down resistor 296. The delay unit 292 can be an integrator that includes an integrating resistor 271 and an integrating capacitor 272. The second control branch 293 includes a third transistor 298 and a pull-up resistor 299.

A base electrode and a collector electrode of the second transistor 294 are connected to the second terminal 222 and the third terminal 223 of the PWM IC 220 respectively. An emitter electrode of the second transistor 294 is connected to a negative terminal of the Zener diode 295. A positive terminal of the Zener diode 295 is grounded via the pull-down resistor 296, and is electrically coupled to a base electrode of the third transistor 298 via the integrating resistor 271. The base electrode of the third transistor 298 is further grounded via the integrating capacitor 272. A collector electrode of the third transistor 298 receives the inner power voltage signal via the pull-up resistor 299, and an emitter electrode of the third transistor 298 is grounded.

In operation, the external DC voltage signal $V_{DC}$ is applied to the third terminal 223 of the PWM IC 220, so as to enable the PWM IC 220. Thereby, a pulse signal is provided to the electronic switch 240 via the fifth terminal 224. The electronic switch 240 is switched on and switched off alternately accordingly to the pulse signal, and the first coil 211 correspondingly generates a variable magnetic field.

Due to the variable magnetic field, the second coil 212 and the third coil 213 respectively generate a first AC voltage signal and a second AC voltage signal. The first AC voltage signal serves as an output voltage, and is applied to the load circuit. The second AC voltage signal is rectified and filtered by the rectifying diode 231 and the filter capacitor 232 respectively, and converted to an inner DC power voltage signal. The inner DC power voltage signal is then supplied to the PWM IC 220 via fourth terminal 224, and also supplied to the base electrode of the first transistor 264 via the pull-up resistor 299. Thereby the first transistor 264 is switched on, and the voltage division branch 262 is enabled.

The first terminal 221 of the PWM IC 220 detects an output current of the power supply circuit 200 (i.e. a secondary current I1 of the transformer 214) via the feedback circuit 260. In particular, a primary current I2 of the transformer 214 that flows through the electronic switch 240 is sampled by the sampling branch 260. Because the primary current I2 and the secondary current I1 satisfy I2/I1=N1/N2, where N1 and N2 are both constants that respectively represent the windings of the first coil 211 and the second coil 212, a result of the current sampling can be equivalent as the output current. In addition, due to the sampling resistor 265, a sampled voltage V1 is generated according to the current sampling result. The sampled voltage V1 is configured as a feedback signal, and is received by the first terminal 221 of the PWM IC 220. The PWM IC 220 further modulates a pulse width of the pulse signal according to the sampled voltage, and thereby an output current of the power supply circuit 200 is adjusted.

If a voltage of the source electrode of the electronic switch 240 is V2 (V2=R0*I2=R0*I1*N1/N2, where R0 represents a resistance of the first resistor 250), due to the voltage division branch 262, the sampled voltage V1 of the current sense terminal CS can be expressed as V1=V2*(R2/(R1+R2)), where R1 and R2 respectively represent resistances of the sampling resistor and the voltage-dividing resistor 263. To a typical PWM IC 220, the first terminal 221 of the PWM IC 220 has a primary maximum endurable voltage Vmax, and when the sampled voltage V1 exceeds the primary maximum endurable voltage Vmax (which may occur when the power supply circuit 200 is overloaded), the PWM IC 220 stops the pulse signal, forcing the voltage conversion circuit 210 into a protected state. Without the voltage division branch 262, a maximum endurable value of the voltage V2 should equal Vmax. In the power supply circuit 200, however, the voltage division branch 262 causes an actual maximum endurable value of the voltage V2 to expand to substantially equal Vmax*((R1+R2)/R2). That is, anti-overloading capability of the power supply circuit 200 is improved efficiently.

Moreover, the coupling circuit 280 generates a coupling voltage according to an output voltage of the power supply circuit 200. In detail, when the load circuit is in a normal working state, the output voltage is a relatively stable DC voltage signal, and enables the LED to emit light in an acceptable quantity. The light correspondingly causes the photoelectric transistor to switch on completely, whereby an electrical potential of the second terminal 222 of the PWM IC 220 is pulled down. That is, a low level coupling voltage signal is applied to second terminal 222, and causes the PWM IC 220 to work normally and output the pulse signal continuously.

When a short circuit is generated in the load circuit, very little voltage is applied to the LED, such that the LED stops emitting light. Thereby the photoelectric transistor is switched off, and a voltage of the feedback terminal FB is pulled up to be relatively high. That is, a relatively high level coupling voltage, which is greater that an inner threshold voltage VT1 of the PWM IC 220, is applied to the second terminal 222. Such relatively high level coupling voltage signal causes the PWM IC 220 to interrupt the pulse signal immediately, with the voltage conversion circuit 210 becoming disabled accordingly, and power supply circuit 200 is forced to enter a protected state.

When the power supply circuit 200 is in an overload state, the output current I2 increases. This causes the primary current I1 to increase correspondingly, such that the voltage V2 of the source electrode of the electronic switch 240 is also increased. When the overload is somewhat serious, the voltage V2 exceeds the primary maximum endurable voltage Vmax of the first terminal 221 of the PWM IC 220, but does not reach the actual maximum endurable value. In addition, the increased output current correspondingly decreases the output voltage of the power supply circuit 200, reducing the light emitted by the LED accordingly. In this situation, the photoelectric transistor is switched on incompletely. Compared with the normal working state, the voltage of the second terminal 222 is pulled up to exceed a threshold voltage $V_{T2}$ of the second transistor 294, but does not reach the inner threshold voltage $V_{T1}$. That is, the coupling voltage is from $V_{T2}$ to $V_{T1}$. Because the coupling voltage is generated based on the output voltage, the output voltage is within a certain predetermined range. Such coupling voltage causes the second transistor 294 to be switched on, and accordingly a charging mean is provided in the control circuit 290. The inner power voltage signal starts to charge the integrating capacitor 272 via the charging mean. Thus a voltage of the integrating capacitor 272 increases.

If the overload lasts for a long time, the power supply circuit 200 may burn out and fail. However, after a predetermined period of time (i.e. the charging period of the integrating capacitor 272), the voltage of the integrating capacitor 272 reaches a threshold voltage $V_{T3}$ of the third transistor 298, such that the third transistor 298 is switched on. The voltage of the base electrode of the first transistor 264 is then pulled down by the third transistor 298, and accordingly the first transistor 264 is switched off. In this situation, the voltage division branch 262 is disabled, and the anti-overload output of power supply circuit 200 ceases. The sampled voltage V1 received by the first terminal 222 is converted to that of voltage V2 of the source electrode of the electronic switch

240. Because the voltage V2 exceeds the maximum endurable voltage Vmax, the PWM IC 220 immediately stops outputting the pulse signal. Therefore, the power supply circuit 200 enters the protected state, and is prevented from being destroyed.

If the overload lasts for only a short time (i.e. the power supply circuit 200 is in an instantaneous overload), the second transistor 294 is switched off before the voltage of integrating capacitor 272 being charged to the threshold voltage $V_{T3}$ of the third transistor 298. Thereby, the charging mean is removed, and the third transistor 298 cannot be switch on. The voltage division branch 262 continues to function, such that the power supply circuit 200 is maintained in the normal working state. That is, the control circuit 290 applies the delay unit 292 to provide a predetermined delay time period. If the overload lasts within the predetermined delay time period, the control circuit 290 controls the power supply circuit 200 to be in the normal working state. If the overload lasts beyond the predetermined delay time period, the control circuit 290 controls the power supply circuit 200 to enter the protected state.

In summary, the power supply circuit 200 employs the voltage division branch 262 to expand the anti-overloading capability thereof, and employs a control circuit 290 to determine whether to disable the voltage division branch 262. When the output voltage is within the above-described range, and the power supply circuit 200 enters a long-period overload, the control circuit 290 disables the voltage division branch 262, and the power supply circuit 200 is protected from burnout. When the power supply circuit 200 enters instantaneous overload due to the delay unit 292 of the control circuit 290, the voltage division branch 262 is maintained, and power supply circuit 200 can continue to work normally. Thus unexpected shutdown of the power supply circuit 200 from instantaneous overload is prevented, and the operation of the power supply circuit 200 is more reliable.

Figure 2:
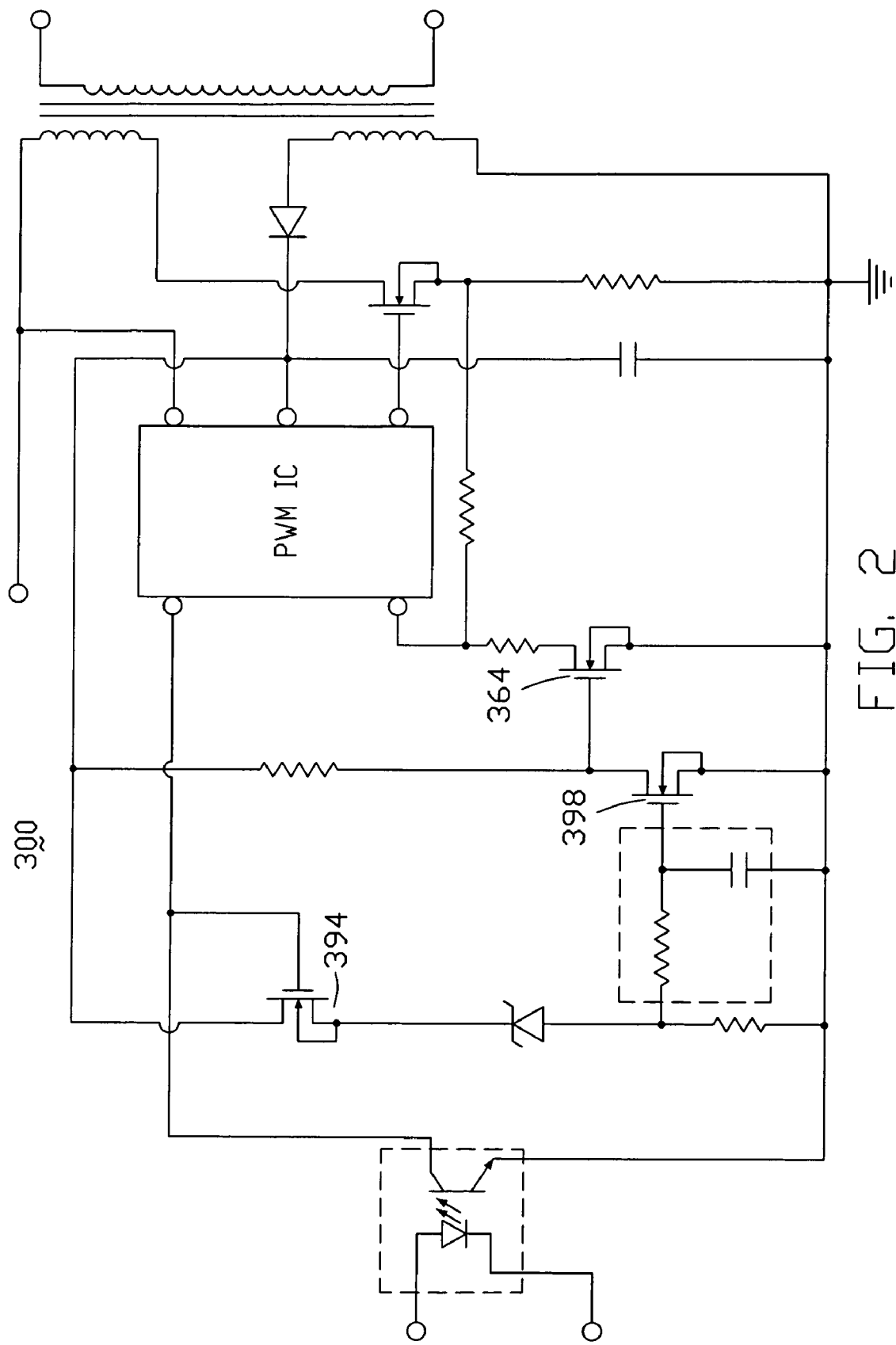
FIG. 2 is a diagram of a power supply circuit according to a second embodiment of the present invention.

FIG. 2 is a diagram of a power supply circuit 300 according to a second embodiment of the present invention. The power supply circuit 300 is similar to the above-described power supply circuit 200, differing only in that the power supply circuit 300 includes a PWM IC (not labeled), a voltage division branch (not labeled), and a control circuit (not labeled). The voltage division branch includes a first transistor 364. The control circuit includes a second transistor 394 and a third transistor 398. The first transistor 364, the second transistor 394, and the third transistor 398 are all N-channel metal oxide semiconductor field effect transistor (MOS-FET).

In particular, all the resistors and capacitors in the voltage division branch and the control circuit can be in MOS form, such that the voltage division branch and the control circuit can be merged into the PWM IC. Thus the circuit structure of the power supply circuit 300 is simple.

It is to be further understood that even though numerous characteristics and advantages of preferred and exemplary embodiments have been set out in the foregoing description, together with details of structures and functions associated with the embodiments, the disclosure is illustrative only; and changes may be made in detail (including in matters of arrangement of parts) within the principles of the invention to the full extent indicated by the broad general meaning of the terms in which the appended claims are expressed.

What is claimed is:

1. A power supply circuit, comprising:
   a pulse width modulation circuit configured for providing a pulse signal;
   a voltage conversion circuit configured for converting a primary voltage to an output voltage according to the pulse signal;
   a feedback circuit comprising a sampling branch configured for detecting a current of the voltage conversion circuit and accordingly providing a feedback signal, and a voltage division branch electrically coupled to the sampling branch; and
   a control circuit electrically coupled to the voltage division branch, configured for disabling the voltage division branch after a predetermined period of time when the output voltage is within a predetermined range.

2. The power supply circuit of claim 1, wherein when the output voltage exceeds the predetermined range, the pulse width modulation circuit stops providing the pulse signal immediately.

3. The power supply circuit of claim 1, wherein when the output voltage is less than the predetermined range, the pulse width modulation circuit provides the pulse signal normally.

4. The power supply circuit of claim 1, wherein the voltage division branch is configured for expanding an anti-overloading ability of the pulse width modulation circuit.

5. The power supply circuit of claim 1, wherein the sampling branch comprises a sampling resistor electrically coupled between the voltage conversion circuit and the voltage division branch.

6. The power supply circuit of claim 5, wherein the pulse width modulation circuit comprises a first terminal configured for receiving the feedback signal, and the sampling branch is electrically coupled between the first terminal and the voltage conversion circuit.

7. The power supply circuit of claim 6, wherein the voltage dividing circuit comprises a voltage dividing resistor and a first transistor, a base electrode of the first transistor is electrically coupled to the control circuit, a collector electrode of the first transistor is electrically coupled to the first terminal of the pulse width modulation via the voltage dividing resistor, and an emitter electrode of the first transistor is grounded.

8. The power supply circuit of claim 1, further comprising a coupling circuit configured for coupling the output voltage, and correspondingly generating a coupling voltage.

9. The power supply circuit of claim 8, wherein the coupling circuit is a photoelectric coupler.

10. The power supply circuit of claim 8, wherein the pulse width modulation circuit further comprises a second terminal receiving the coupling voltage, and the pulse width modulation circuit ceases the pulse signal when the coupling voltage indicates that the output voltage has exceeded the predetermined range.

11. The power supply circuit of claim 8, wherein the control circuit comprises a first control unit and a delay circuit, the first control unit configured for receiving the coupling voltage and enabling the delay circuit when the coupling voltage indicates that the output voltage is within the predetermined range.

12. The power supply circuit of claim 11, wherein the control circuit further comprises a second control unit electrically connecting the delay circuit and the detecting circuit, and the second control unit is configured for disabling the voltage division branch under the control of the delay circuit.

13. The power supply circuit of claim 12, wherein the first control unit comprises a second transistor, a Zener diode, and a pull-down resistor, a base electrode of the second transistor is configured for receiving the coupling voltage, a collector electrode of the second transistor is configured for receiving a power voltage, and an emitter electrode of the transistor is electrically coupled to a negative electrode of the Zener diode, wherein a positive electrode of the Zener diode is electrically coupled to the delay circuit and grounded via the pull-down resistor.

14. The power supply circuit of claim 13, wherein the delay circuit is an integrator.

15. The power supply circuit of claim 13, wherein the delay circuit comprises an integrating resistor and an integrating capacitor, an end of the integrating resistor is electrically coupled to the positive terminal of the Zener diode, the other end of the integrating resistor is grounded via the integrating capacitor, and electrically coupled to the second control unit.

16. The power supply circuit of claim 15, wherein the second control unit comprises a pull-up resistor and a third transistor, a base electrode of the third transistor is electrically coupled to the integrating resistor, a collector electrode is configured for receiving the power voltage via the pull-up resistor, and is electrically coupled to the voltage division branch, and an emitter electrode of the third transistor is grounded.

17. The power supply circuit of claim 1, wherein the voltage conversion circuit comprises an electronic switch configured for receiving the pulse signal and a transformer having a first coil and a second coil, wherein an end of the first coil is configured for receiving an external voltage and the other end of the first coil is grounded via the electronic switch.

18. The power supply circuit of claim 17, wherein the voltage conversion circuit further comprises a third coil, a rectifying diode, and a filter capacitor configured for providing an inner power voltage to the pulse width modulation circuit cooperatively.

19. A power supply circuit, comprising:
a pulse width modulation circuit configured providing a pulse signal;
a voltage conversion circuit configured for generating an output voltage according to the pulse signal;
a detecting circuit comprising a sampling branch electrically coupled to the voltage conversion circuit, and a voltage division branch electrically coupled to the sampling branch; and
a control circuit electrically coupled to the voltage division branch;
wherein when the output voltage is within a predetermined range, the control circuit disables the voltage division branch after a predetermined period of time.

* * * * *